(12) United States Patent
Volchko

(10) Patent No.: US 8,297,657 B2
(45) Date of Patent: Oct. 30, 2012

(54) JOINT THROUGH A VEHICLE FRAME

(75) Inventor: Scott J. Volchko, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 448 days.

(21) Appl. No.: 12/485,419

(22) Filed: Jun. 16, 2009

(65) Prior Publication Data

US 2010/0314866 A1 Dec. 16, 2010

(51) Int. Cl.
*F16L 35/00* (2006.01)
*F16L 5/00* (2006.01)

(52) U.S. Cl. .......... 285/19; 285/20; 285/62; 285/140.1; 285/192

(58) Field of Classification Search ............ 285/19, 285/20, 31, 62, 139.1, 139.3, 140.1, 192, 285/194, 397
See application file for complete search history.

(56) References Cited

U.S. PATENT DOCUMENTS

| | | | |
|---|---|---|---|
| 3,200,366 A | | 8/1965 | Stuart |
| 3,366,405 A | * | 1/1968 | Sevrence ................ 403/197 |
| 3,427,894 A | * | 2/1969 | Tschanz ................. 74/502.4 |
| 4,234,218 A | | 11/1980 | Rogers |
| 4,236,577 A | * | 12/1980 | Neudeck ................. 165/175 |
| RE30,850 E | * | 1/1982 | Gordy et al. ............ 403/197 |
| 4,773,279 A | * | 9/1988 | Spease et al. ........... 74/502.4 |
| 4,887,331 A | * | 12/1989 | Thomas ................... 16/2.1 |
| 4,981,310 A | * | 1/1991 | Belisaire ................ 285/140.1 |
| 5,099,825 A | * | 3/1992 | Massey et al. .......... 122/13.01 |
| 5,114,250 A | * | 5/1992 | Usui ........................ 285/319 |
| 5,163,619 A | * | 11/1992 | Wada ..................... 239/284.1 |
| 5,466,015 A | * | 11/1995 | Berenter ................. 285/140.1 |
| 5,692,783 A | * | 12/1997 | Watanabe et al. ........... 285/61 |
| 5,797,627 A | * | 8/1998 | Salter et al. ............... 285/38 |
| 2002/0171239 A1 | * | 11/2002 | Castel et al. ............. 285/19 |
| 2004/0094952 A1 | * | 5/2004 | Twardawski et al. ...... 285/210 |
| 2004/0135371 A1 | | 7/2004 | Masuda et al. |
| 2005/0057041 A1 | * | 3/2005 | Shida et al. ............. 285/140.1 |
| 2006/0001261 A1 | * | 1/2006 | Miyajima et al. ........ 285/136.1 |

FOREIGN PATENT DOCUMENTS

WO WO 2005/073007 A1 8/2005

* cited by examiner

*Primary Examiner* — James Hewitt
(74) *Attorney, Agent, or Firm* — Rankin, Hill & Clark LLP

(57) ABSTRACT

A joint for a fluid line of a vehicle for conveying a fluid through a vehicle frame member includes a unitary body having a first end adapted for engagement to a first fluid conduit and a second end adapted for engagement to a second fluid conduit. The body is sized to span between first and second walls of the vehicle frame member. A bore extends axially through the body and fluidly connects the first and second fluid conduits. The joint includes at least one connector configured to engage the vehicle frame member for releasably mounting the joint to the vehicle frame member.

16 Claims, 5 Drawing Sheets

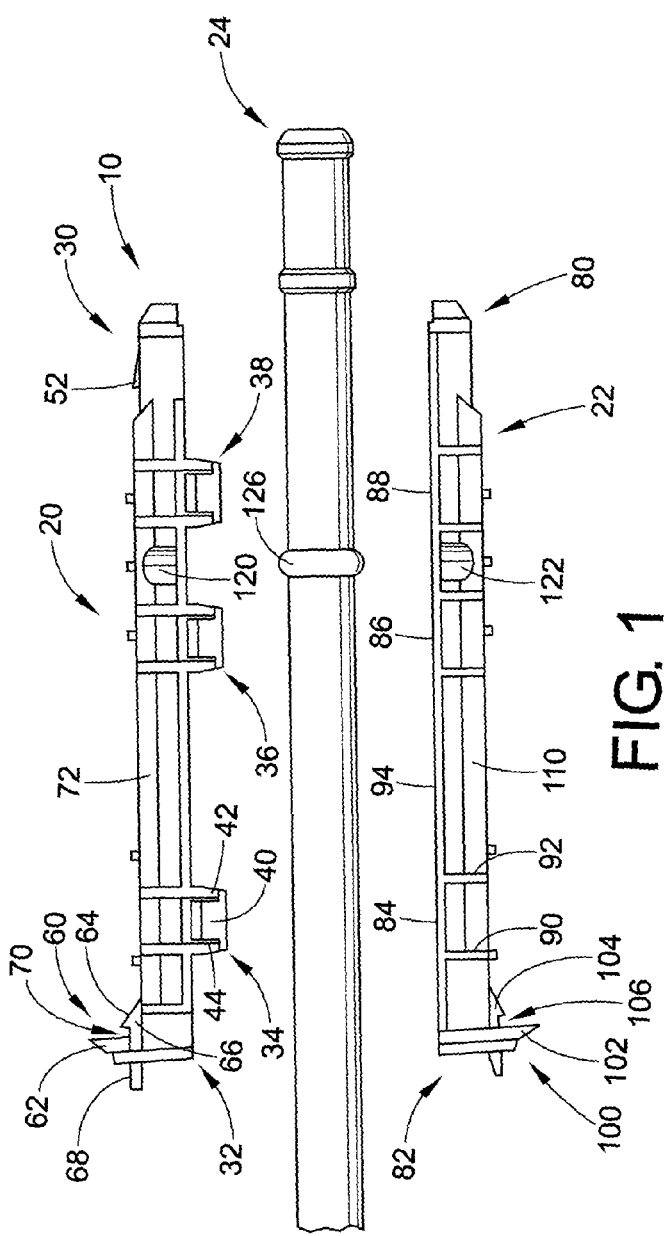
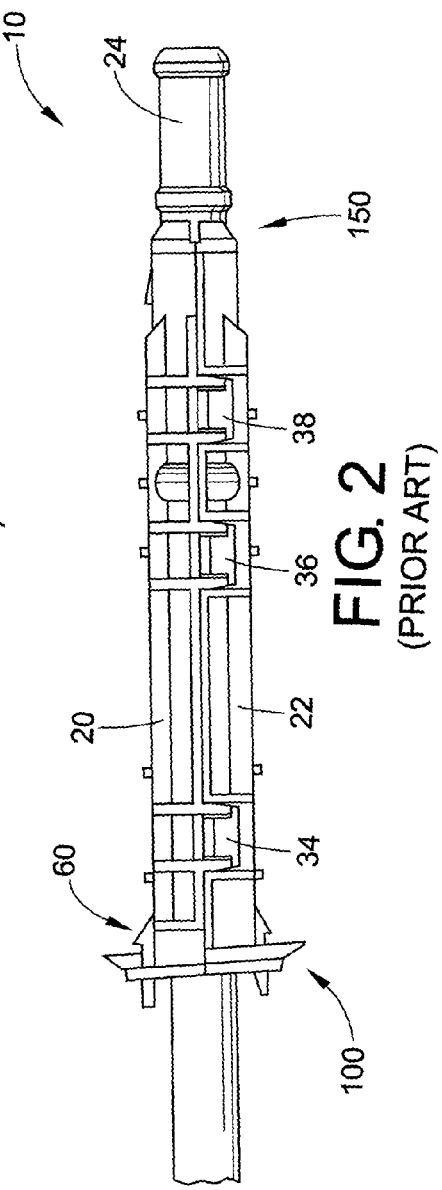
FIG. 1 (PRIOR ART)
FIG. 2 (PRIOR ART)

ns. The joint comprises a body having a first end and a second end. The body defines an internal fluid passage for conveying a fluid through a vehicle frame member between the separate fluid conduits. A connector is connected to the body and releasably engages a wall of the vehicle frame member for mounting the joint to the vehicle frame member. A stopper is releasably coupled to the body for engaging the vehicle frame member. The stopper limits relative movement between the joint and the vehicle frame member.

JOINT THROUGH A VEHICLE FRAME

BACKGROUND

Exemplary embodiments herein generally relate to a fluid line for a vehicle, and more particularly, to a joint for a fuel line of a vehicle, such as a joint extending through a vehicle frame member for fluidly connecting a first fluid conduit to a separate second fluid conduit.

Vehicle fuel systems generally include tubing in a wheel house area, such as, tubing for a vent line. This tubing is sometimes transferred through a vehicle frame member (e.g. a rail or beam). One reason for the transfer of the tubing through a vehicle frame member is to control sloping of the tubing to prevent pooling of liquids. For example, controlling the slope can limit up and down transitions in a vent line that could trap liquid within the line.

In a fuel system, the fuel lines slope downward toward the fuel tank, thus preventing pooling of liquid fuel in the line. Liquid in the line can affect air flow through the line and can cause the system to function incorrectly. Another reason to pass tubing through a vehicle frame member is to protect the tubing from moving parts, such as suspension components, during movement of the vehicle on the road and/or during a crash event. By placing the tubing through the vehicle frame member, the tubing is clear from any moving parts in the suspension and can also be kept clear of road debris that may hit the lower side of the vehicle frame.

Known fuel system joints typically comprise a tube or pipe held in place relative to the vehicle frame member by a plastic clamp or combination of plastic clamps. These known designs have several parts. Thus a significant cost is involved with passing the tubing through the vehicle frame member. By reducing the complexity of the known joint designs, costs and weight of the vehicle fuel system, for example, can be reduced without affecting the overall performance or safety of the vehicle fuel system.

BRIEF DESCRIPTION

According to one aspect, a joint for a fluid line of a vehicle is provided for conveying a fluid through a vehicle frame member. The joint comprises a unitary body having a first end adapted for engagement to a first fluid conduit and a second end adapted for engagement to a second fluid conduit. The body is sized to span between first and second walls of the vehicle frame member. A bore extends axially through the body. The bore fluidly connects the first fluid conduit to the second fluid conduit. At least one connector is configured to engage the vehicle frame member for releasably mounting the joint to the vehicle frame member.

According to another aspect, a one-piece joint for a fuel line of a vehicle extends through a vehicle frame member for fluidly connecting a first fluid conduit to a second fluid conduit. The joint comprises a body having a first end configured to engage the first fluid conduit and a second end configured to engage the second fluid conduit. The first and second ends are located on opposite sides of the vehicle frame member. The body defines an internal fluid passage to conduct a fluid through the vehicle frame member. A first connector is connected to the body for releasably engaging a first wall of the vehicle frame member. A second connector is connected to the body for releasably engaging a second wall of the vehicle frame member. The first and second connectors mount the one-piece joint to the vehicle frame member.

According to yet another aspect, a joint for a fuel line of a vehicle is provided for fluidly connecting separate fluid conduits. The joint comprises a body having a first end and a second end. The body defines an internal fluid passage for conveying a fluid through a vehicle frame member between the separate fluid conduits. A connector is connected to the body and releasably engages a wall of the vehicle frame member for mounting the joint to the vehicle frame member. A stopper is releasably coupled to the body for engaging the vehicle frame member. The stopper limits relative movement between the joint and the vehicle frame member.

BRIEF DESCRIPTION OF THE DRAWINGS

FIG. 1 is an exploded view of a known multi-piece joint for a vehicle fuel system, the joint including a pair of clamps received on a separate pipe or tube.

FIG. 2 is an assembled view of the joint of FIG. 1.

DETAILED DESCRIPTION

Figure 3:
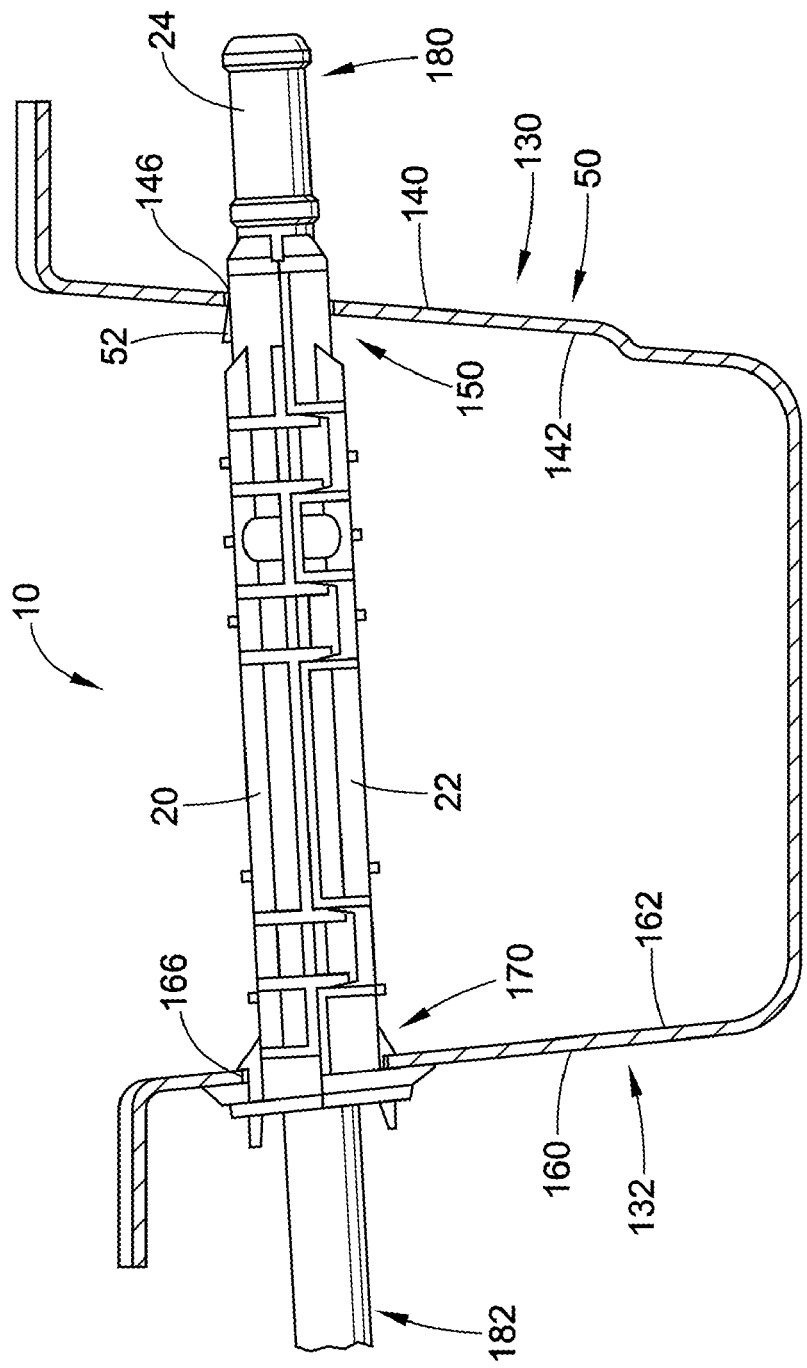
FIG. 3 illustrates the assembled joint of FIG. 2 connected to a vehicle frame member for conveying fuel through the vehicle frame member.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-3 illustrate a known multi-piece joint 10 for a vehicle fuel system for conveying fuel through a vehicle frame member 50. The multi-piece joint 10 includes a first section 20, a second section 22, and a separate fluid conduit or pipe 24. The first and second sections 20, 22 are configured to be releasably connected to each other, and together define a bore dimensioned to receive the fluid conduit 24. The multi-piece joint 10 extends through the vehicle frame member 50 for fluidly connecting a first fluid conduit (not shown) to a second fluid conduit (not shown).

The first section 20 of the multi-piece joint 10 includes a first end 30 and a second end 32. Three spaced apart tabs 34, 36, 38 are arrayed between the first and second ends 30, 32. Each tab 34, 36, 38 includes a displaceable finger 40 configured to engage the second section 22. A pair of radially extending slits 42, 44 are located on each tab 34, 36, 38, the slits flanking finger 40 of each tab. The slits 42, 44 allow movement of the finger 40 as the first section is being connected to the second section 22.

Located adjacent the first end 30 is a shoulder or barb 52. The barb 52 has a triangular configuration which can limit relative movement of the assembled multi-piece joint 10 relative to the vehicle frame member 50 (FIG. 3). A connection assembly 60 is located adjacent the second end 32 of the first section 20. The connection assembly 60 includes a radial flange 62 and a stop 64. The stop 64 includes a first portion 66 having a generally triangular shape and a second portion 68 extending axially outwardly from the first portion. The radial flange 62 is located on the second portion 68 and is axially spaced from the first portion 66 to define an opening 70. The first section 20 further includes at least one axially elongated fin 72 for providing support to the first section.

With continued reference to FIGS. 1 and 2, the second section 22 of the multi-piece joint 10 includes a first end 80 and a second end 82. Arrayed between the first and second ends 80, 82 are three slots 84, 86, 88. The slots 84, 86, 88 are configured to receive the respective tabs 34, 36, 38 of the first section 20. Each slot 84, 86, 88 includes a pair of side walls 90, 92. The side walls 90, 92 extend radially from a wall 94 which spans generally between the first and second ends 80, 82. The second section 22 further includes a connector assembly 100 located adjacent the second end 82. Similar to connector assembly 60, connector assembly 100 includes a radial flange 102 spaced from a stop 104 to define an opening 106. The stop 104 is a mirror image of the stop 64 of the first section 20. At least one axially elongated fin 110 is provided on the second section 22 for providing support to the second section.

To assemble the first and second sections 20, 22 onto the fluid conduit 24, each of the first and second sections includes a respective pocket (pocket 120 on first section 20 and pocket 122 on second section 22) configured to receive a portion of a collar 126 of the fluid conduit 24. The tabs 34, 36, 38 are positioned in the respective slots 84, 86, 88 and the pockets 120, 122 surround the collar 126. The engagement of the pockets 120, 122 with the collar 126 limits axial movement of the first and second sections 20, 22 on the fluid conduit 24. The multi-piece joint 10 can then be secured to the vehicle frame member 50.

With reference to FIG. 3, the vehicle frame member 50 can be generally U-shaped in cross-section and includes a first wall 130 and a second wall 132 spaced from the first wall. The first wall 130 includes an outer or first surface 140, an inner or second surface 142 and an opening 146 dimensioned to receive a first section 150 of the assembled multi-piece joint 10. The second wall 132 includes an outer or first surface 160, an inner or second surface 162, and an opening 166 dimensioned to receive a second section 170 of the assembled multi-piece joint 10. The multi-piece joint 10 spans between the first and second walls 130, 132 of the vehicle frame member 50. Once positioned through the vehicle frame member 50, a first fluid conduit (not shown) can be secured to a first end 180 of the fluid conduit 24 and a separate second fluid conduit (not shown) can be secured to a second end 182 of the fluid conduit 24.

To mount the multi-piece joint 10 to the vehicle frame member 50, the multi-piece joint 10 is first inserted through the opening 166 of the second wall 132 (with the ends 30, 80 of the first and second sections 20, 22 leading) and then the through the opening 146 of the first wall 130 until the barb 52 engages the first wall 130. As the multi-piece joint 10 is being inserted through the opening 166, the wall 132 is engaged by the stop 64 of the first section 20 and the stop 104 of the second section 22. Particularly, as the wall 132 engages the respective stops 64, 104, a sloped surface or tapered section of each stop 64, 104 slightly compresses until each stop at least partially passes through the opening 166. Once positioned in the opening 166, the wall 132 is secured in the openings 70, 106 between the radial flanges 62, 102 and the stops 64, 104. As indicated previously, the multi-piece joint 10 including the first and second sections 20, 22 and the fluid conduit 24 has an increased cost involved with passing a fluid line through the vehicle frame member 50. Further, with the construction of the connector assemblies 60, 100, the multi-piece joint 10 can be difficult to remove from the vehicle frame member 50 in case or repair.

Figure 7:
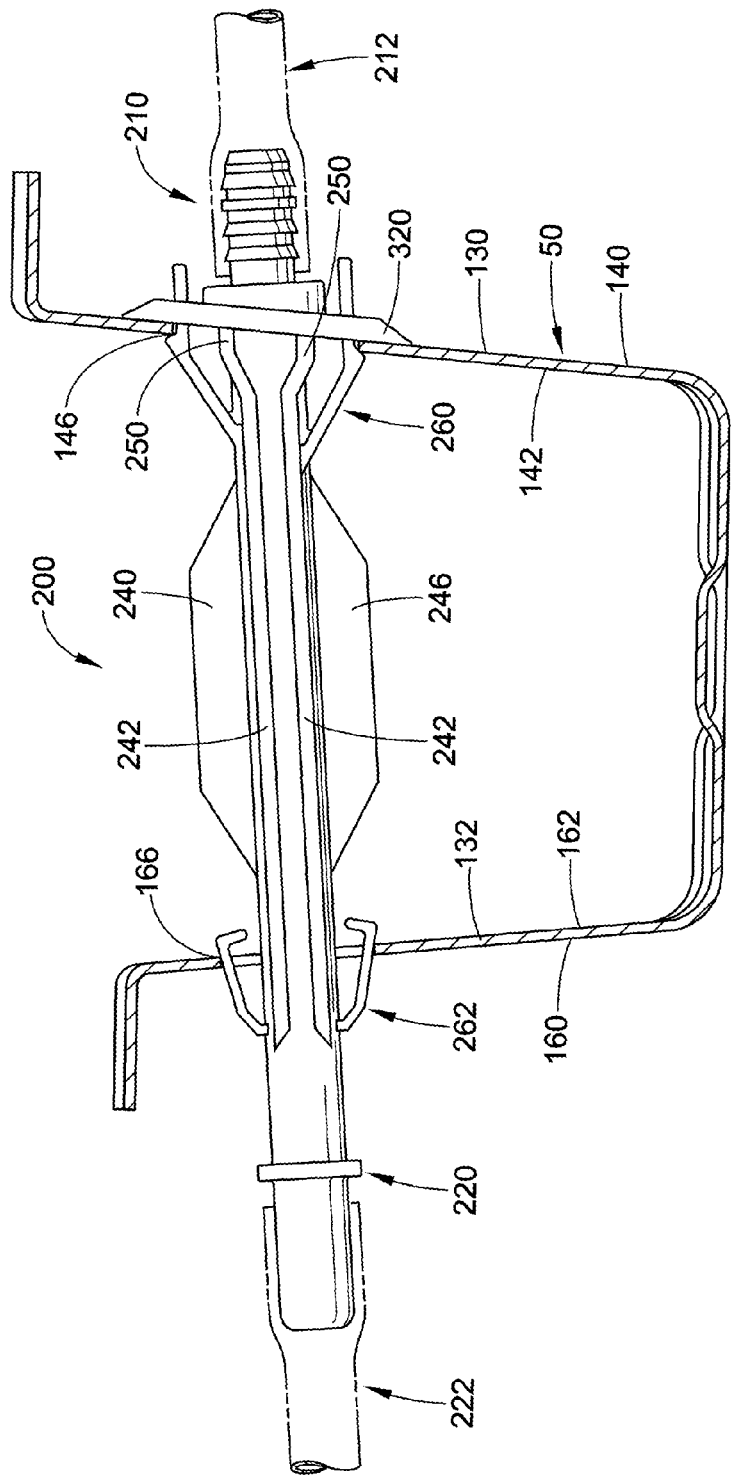
FIG. 7 is a side view of the joint of FIG. 4 extending through a vehicle frame member for fluidly connecting a first fluid conduit to a separate fluid conduit.

With reference now to FIGS. 4-7, a joint 200 for a fluid line of a vehicle according to an exemplary embodiment of the present disclosure is illustrated for conveying fluid through the vehicle frame member 50. The joint 200 comprises a unitary body 202 having a first end 210 adapted for engagement to a first fluid conduit 212 and a second end 220 adapted for engagement to a separate second fluid conduit 222. The first and second fluid conduits 212, 222 are schematically illustrated in phantom lines in FIG. 7. At least one of the first and second ends 210, 220 of the joint body 202 can be shaped as one of a quick connect end form and a press fit end form. In the depicted embodiment, the first end 210 is shaped as a press fit end form and the second end 220 is shaped as a quick connect end form. The joint 200 can be made of a thermo plastic; although, alternative materials for the joint are also contemplated. The body 202 defines a bore or internal fluid passage 230 (FIG. 6) which fluidly connects the first fluid conduit 212 to the second fluid conduit 222 to conduct or convey a fluid through the vehicle frame member 50 between the first and second fluid conduits 212, 222. This differs from the known multi-piece joint 10 which includes the separate fluid conduit 24. As shown in FIG. 7, the joint body 202 is sized to span between the first and second walls 130, 132 of the vehicle frame member 50, the first and second ends 210, 220 of the joint 200 being located on opposite sides of the vehicle frame member 50. As will be described in greater detail below, the joint 200 further includes at least one connector configured to engage the vehicle frame member 50 for releasably mounting the joint 200 to the vehicle frame member 50.

The body 202 includes axially extending fins for providing support to the body. Particularly, in the depicted exemplary embodiment, the body 202 includes diametrically-spaced first fins 240, 246 and diametrically-spaced second fins 242, 248. The second fins 242, 248 are configured to insure proper orientation of the joint 200 relative to the vehicle frame member 50. As shown, the joint 200 includes a pair of second fins 242 and a pair of second fins 248 diametrically spaced from the pair of second fins 242. Each first fin 240, 246 has a length shorter than a length of each of the second fins 242, 248. Each second fin 242, 248 has a respective first end section 250, 252 adjacent the first end 210 of the body 202 and a respective second end section 254, 256 adjacent the second end 220 of the body 202. As will be discussed below, the first end section 250, 252 of each second fin 242, 248 can be flared for engaging a stopper 320 releasably connected to the joint body 202.

Figure 4:
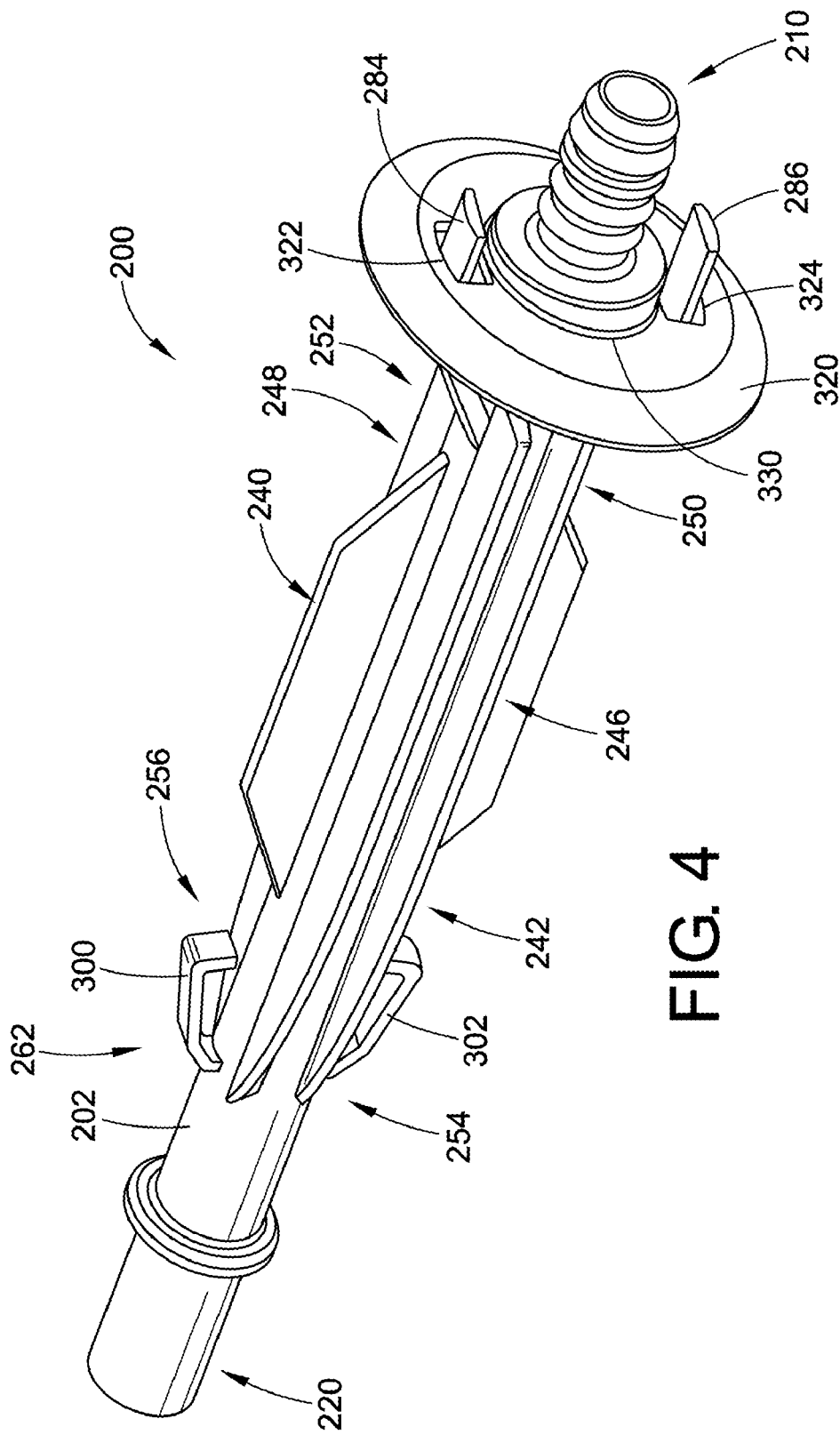
FIG. 4 is a perspective view of a joint for a vehicle fuel system according to an exemplary embodiment of the present disclosure.
Figure 5:
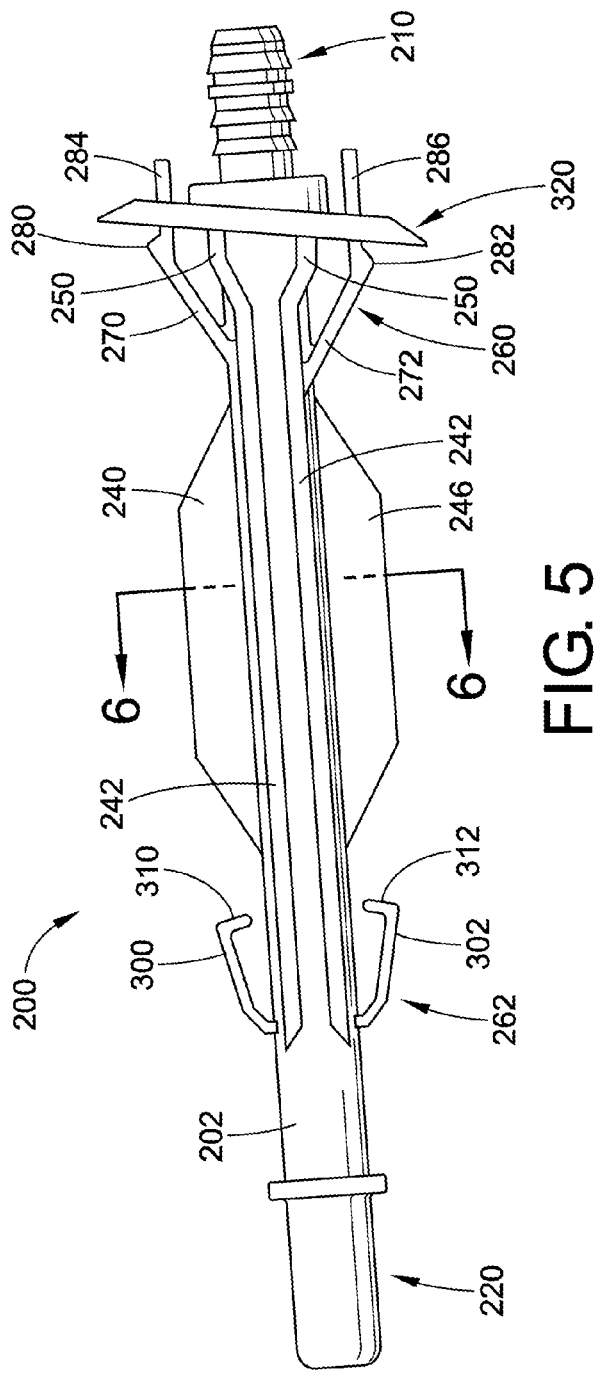
FIG. 5 is a side view of the joint of FIG. 4.
Figure 6:
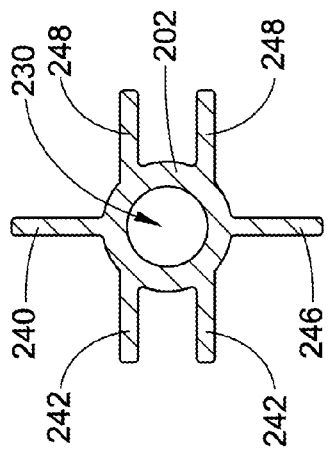
FIG. 6 is a cross-sectional view of the joint of FIG. 5 taken generally along line 6-6 of FIG. 5.

With particular reference to FIGS. 4 and 5, the joint 200 includes a first connector 260 adjacent the first end 210 of the joint body 202 for releasably engaging the first wall 130 of the vehicle frame member 50. The joint includes a second connector 262 located adjacent the second end 220 of the joint body 202 for releasably engaging the second wall 132 of the vehicle frame member 50. With particular reference to FIG. 5, the first connector 260 includes first and second displaceable locking tabs 270, 272. Each locking tab 270, 272 is generally aligned with one of the first fins 240, 246 and projects outwardly from the joint body 202. Each of the first and second locking tabs 270, 272 includes a respective stepped portion or shoulder 280, 282 and a finger 284, 286 extending outwardly from the respective stepped portion 280, 282. As shown in FIG. 7, the stepped portions 280, 282 of the first and second tabs 270, 272 engage the inner surface 142 of the first wall 130 of the vehicle frame member 50. The fingers 284, 286 of the first and second tabs 270, 272 at least partially project through the opening 146 of the first wall 130.

Similarly, the second connector 262 includes first and second displaceable alignment tabs 300, 302. Each alignment tab 300, 302 is generally aligned with one of the first fins 240, 246 and projects outwardly from the joint body 202. As will be discussed in great detail below, the first and second alignment tabs 300, 302 are compressed by the engagement of the second connector 262 with the second wall 132 of the vehicle frame member 50. As shown in FIG. 5, the first and second alignment tabs 300, 302 include a respective downwardly extending finger 310, 312. As the first and second alignment tabs are displaced or compressed by the engagement of the second connector 262 with the second wall 132, the fingers 310, 312 can engage the body 202 of the joint 200 to prevent further deflection of the alignment tabs 300, 302.

The stopper 320 is releasably coupled to the body 202 for engaging the vehicle frame member 50 and limiting relative movement between the joint 200 and the vehicle frame member 50. As shown in FIG. 5, the stopper 320 is releasably mounted to the first connector 260, particularly the first and second locking tabs 270, 272. As shown in FIG. 7, the stopper 320 engages the outer surface 140 of the first wall 130 of the frame member 50. This limits movement between the joint 200 and the vehicle frame member 50. As best shown in FIG. 4, the stopper 320 includes a pair of diametrically spaced openings 322, 324 which are dimensioned to receive the respective fingers 284, 286 of the first and second locking tabs 270, 272. Outwardly displacement of the fingers 284, 286 within the openings 322, 324 prevents movement of the stopper 320 relative to the joint body 202. In the depicted embodiment, the stopper 320 has a generally umbrella shape which provides a good fit to the first wall 130 of the vehicle frame member 50, although alternative shapes for the stopper are contemplated.

With reference now to FIG. 7, to assemble the joint 200 to the vehicle frame member 50, the second end 220 of the body 202 is inserted (with end 220 leading) through the opening 146 located in the first wall 130 and the opening 166 located in the second wall 132. As the joint 200 is being positioned through the opening 166, the first connector 260 releasably engages the first wall 130 of the vehicle frame member 50. Particularly, the first wall 130 slides along an outer surface of each tab 270, 272 as the joint 200 extends through the opening 166. Engagement of the first wall 130 with the first connector 260 causes downward displacement of the first and second tabs 270, 272. The joint 200 is inserted through the vehicle frame member 50 until the first wall 130 moves past the stepped portions 280, 282. In this position, the stepped portions 280, 282 engage the inner surface 142 of the first wall 130 and the fingers 284, 286 extend at least partially through the opening 146. The fingers 284, 286 are biased outwardly in the opening 146. Engagement of the second wall 132 with the second connector 262 causes downward displacement of the first and second tabs 300, 302. The second connector 262 is at least partially compressed within the opening 166.

With reference to FIGS. 4 and 7, the stopper 320 is then connected to the body 202. The stopper 320 includes a central opening 330 dimensioned to receive the first end 210 of the body 202. As the stopper 320 is slid onto the joint body 202, the fingers 284, 286 are received within the openings 322, 324 of the stopper 320. To mount the stopper 320 to the first connector 260, the fingers 284, 286 are depressed downwardly and are positioned in the openings 322, 324. The fingers 284, 286 are then released such that the fingers are displaced upwardly thereby engaging the stopper 320 and securing the stopper on the joint 200. In the assembled position, the stopper 320 engages the outer surface 140 of the first wall 130. The first end sections 250, 252 of the second fins 242, 248 are configured to abut the stopper 320 thereby insuring proper orientation of the joint 200 relative to the vehicle frame member 50.

As is evident from the foregoing, the exemplary one-piece joint 200 through the vehicle frame member 50 includes the unitary body 202 and the integrated connectors 260, 262. The elongated body 202 is received through the opposite walls 130, 132 of the vehicle frame member 50. Opposite ends 210, 220 of the elongated body 202 are each configured to engage a separate fluid conduit 212, 222. The elongated one-piece body 202 of the joint 200 is sized to span between the walls 130, 132 of the vehicle frame member 50 such that end forms of the first and second ends 210, 220 of the body 202 are located on opposite sides of the vehicle frame member 50. The body defines the bore or internal passage 230 to conduct a fluid (e.g., a gas or liquid) through the vehicle frame member 50 between the first and second separate fluid conduits 212, 222.

The integrated connector includes the first and second connectors 260, 262. The first connector 260 includes the displaceable tabs 270, 272 releasably engaged within the opening 146 of the first wall 130. The second connector 262 includes the displaceable tabs 300, 302 for engagement in a compressed condition within the second opening 166 of the second wall 132. The plate-like stopper 320 is adapted for contact with an exterior surface 140 of the first wall 130 of the vehicle frame member 50 to limit relative movement between the installed joint body 202 relative to the vehicle frame member 50. The stopper 320 is releasably attached to the joint body 202 by the locking tabs 270, 272 having release fingers 284, 286 that facilitate removal of the stopper 320 from the joint body 202.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A joint for a fluid line for conveying a fluid through a vehicle frame member comprising:
   a unitary body having a first end adapted for engagement to an associated first fluid conduit and a second end adapted for engagement to an associated second fluid conduit, the body being sized to span between first and second walls of an associated vehicle frame member;
   a bore extending axially through the body, the bore adapted to fluidly connect the associated first fluid conduit to the associated second fluid conduit;
   a first connector and a second connector each configured to engage the associated vehicle frame member for releasably mounting the joint to the associated vehicle frame member; and
   a separate stopper releasably mounted to the first connector;
   wherein the first connector includes first and second displaceable locking tabs, each locking tab having a first end connected to the body and a second end projecting outwardly from the body, the first and second locking tabs adapted to engage the first wall of the associated vehicle frame member
   wherein the second connector includes first and second displaceable alignment tabs, each alignment tab having a first end connected to the body and a second end projecting outwardly from the body toward the first connector, the first and second alignment tabs adapted to engage the second wall of the associated vehicle frame member, wherein the first and second connectors are integrally formed with the body to define a one-piece member.

2. The joint of claim 1, wherein the body further includes at least one axially extending fin for providing support to the body.

3. The joint of claim 2, wherein the at least one fin includes at least one first fin and at least one second fin circumferentially spaced from the at least one first fin, the at least one second fin having an axial length such that a first end section of the at least one second fin is adjacent the first connector and a second end section of the at least one second fin is adjacent the second connector, the at least one second fin being configured to ensure proper orientation of the joint relative to the associated vehicle frame member.

4. The joint of claim 3, wherein the at least one first fin includes diametrically spaced first fins, and the at least one second fin includes a first pair of second fins and a second pair of second fins diametrically spaced from the first pair of second fins.

5. The joint of claim 4, wherein a part of the first connector is positioned between the first pair of second fins and the second pair of second fins.

6. The joint of claim 1, wherein the first connector is located adjacent the first end of the joint body for releasably engaging the first wall of the associated vehicle frame member and the second connector is located adjacent the second end of the joint body for releasably engaging the second wall of the associated vehicle frame member.

7. The joint of claim 6, wherein the first and second alignment tabs are configured to be compressed by engagement of the second connector with the second wall of the associated vehicle frame member.

8. The joint of claim 1, wherein each of the first and second locking tabs includes a stepped portion and a finger extending outwardly from the stepped portion, the stepped portion of at least one of the first and second tabs configured to engage an inner surface of the first wall of the associated vehicle frame member, the finger of each of the first and second tabs configured to at least partially project through the first wall.

9. The joint of claim 8, wherein the stopper is configured to engage an outer surface of the first wall of the associated vehicle frame member for limiting relative movement between the joint and the associated vehicle frame member.

10. The joint of claim 9, wherein the stopper includes a pair of openings for receiving the fingers of the first and second locking tabs, outward displacement of the fingers within the openings preventing movement of the stopper relative to the joint body.

11. A vehicle assembly comprising:
a fuel line including a first fluid conduit and a separate second fluid conduit;
a frame member including a first wall and a second wall spaced from the first wall; and
a one-piece joint including:
a body extending through the vehicle frame member for fluidly connecting the first fluid conduit to the second fluid conduit, the body having a first end configured to engage the first fluid conduit and a second end configured to engage the second fluid conduit, the first and second ends being located on opposite sides of the vehicle frame member, the body defining an internal fluid passage to conduct a fluid through the vehicle frame member,
a first connector connected to the body for releasably engaging the first wall of the frame member, and
a second connector connected to the body for releasably engaging the second wall of the frame member, the first and second connectors mounting the one-piece joint to the frame member, wherein each of the first and second connectors includes first and second displaceable tabs which at least partially project through the respective first and second walls of the vehicle frame member, wherein the first and second tabs of each connector are integrally formed with the body to define a unitary member; and
a stopper separate from the joint and including first and second openings, the first and second tabs of the first connector extending at least partially through the openings for mounting the stopper to the joint.

12. The vehicle assembly of claim 11, wherein each of the first and second tabs of the first connector includes a shoulder for engaging an inner surface of the first wall of the frame member.

13. The vehicle assembly of claim 11, wherein each of the first and second tabs of the second connector are compressed by the engagement of the second connector with the second wall of the frame member.

14. The vehicle assembly of claim 11, wherein the body further includes at least one first fin and at least one second fin circumferentially spaced from the at least one first fin, the at least one second fin being configured to ensure proper orientation of the joint relative to the frame member.

15. The vehicle assembly of claim 11, wherein the stopper engages an outer surface of the first wall of the frame member for limiting relative movement between the joint and the frame member.

16. The vehicle assembly of claim 14, wherein the at least one second fin has a first end section spaced from the first end of the body, the first end section engaging the stopper, and a second end section spaced from the second end of the body and axially aligned with the second connector.

* * * * *